United States Patent [19]
Brown et al.

[11] 3,768,030
[45] Oct. 23, 1973

[54] AUTOMATIC SIGNAL ACQUISITION MEANS FOR PHASE-LOCK LOOP WITH ANTI- SIDEBAND LOCK PROTECTION

[75] Inventors: Kenneth H. Brown, Phoenix; Arthur J. Kline, Jr., Scottsdale, both of Ariz.

[73] Assignee: Motorola, Inc., Franklin Park, Ill.

[22] Filed: May 8, 1972

[21] Appl. No.: 251,065

[52] U.S. Cl.................... 331/12, 325/423, 329/122, 331/17, 331/25
[51] Int. Cl. ............................................. H03b 3/04
[58] Field of Search .................................... 331/10–12, 17, 18, 25; 329/122; 325/421–423

[56] References Cited
UNITED STATES PATENTS

| | | | |
|---|---|---|---|
| 2,481,659 | 9/1949 | Guanella | 331/12 |
| 3,070,753 | 12/1962 | Smeulers | 331/11 |
| 3,101,448 | 8/1963 | Costas | 331/12 X |
| 3,403,355 | 9/1968 | Takada | 331/12 X |
| 3,588,734 | 6/1969 | Welti | 331/12 |

Primary Examiner—Roy Lake
Assistant Examiner—Siegfried H. Grimm
Attorney—Foorman L. Mueller et al.

[57] ABSTRACT

There is disclosed a system for improving the acquisition range and for eliminating lock on modulation side bands of a phase-lock loop utilized for receiving and demodulating a transmitted intelligence signal. Signal multipliers are used for phase detection and for giving an amplitude when the loop is in phase lock. The output signals of these multipliers, after passing through low pass filters, and after differentiation of the filter output in the amplitude signal path are multiplied in a four-quadrant analogue multiplier. The output signal of this analogue multiplier, which includes a D.C. term developed as a result of the differentiation which is sign sensitive to the frequency offset, is summed with the output signal of the low pass filter in the phase detector signal path to give a total loop control signal which contains the indicated D.C. term when the offset frequency differs from zero. The D.C. term is scaled to have a magnitude greater than the periodic term of the ordinary control signal resulting from phase-lock onto sidebands of the received signal. When the offset frequency is zero, the D.C. term and the other offset frequency terms disappear and only the ordinary loop control signal remains.

9 Claims, 1 Drawing Figure

PATENTED OCT 23 1973  3,768,030
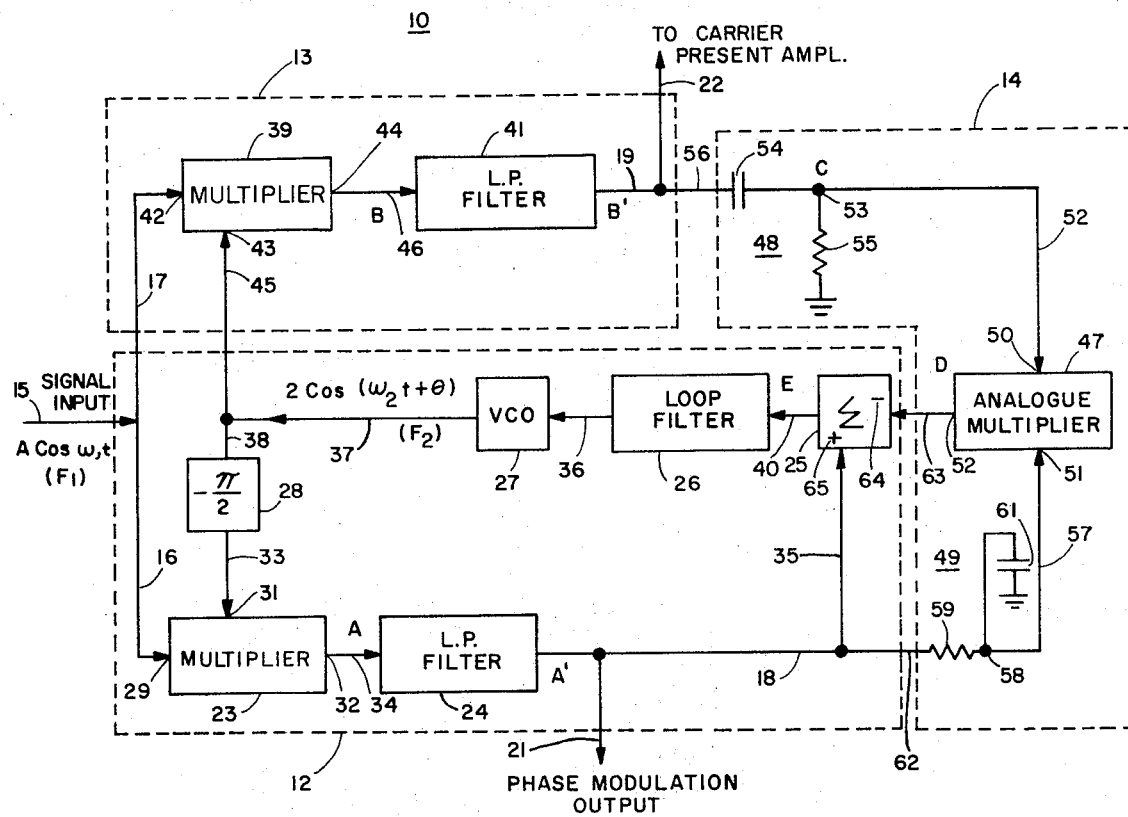

AUTOMATIC SIGNAL ACQUISITION MEANS FOR PHASE-LOCK LOOP WITH ANTI- SIDEBAND LOCK PROTECTION

BAKCGROUND OF THE INVENTION

This invention relates to automatic signal acquisition methods and means for phase-locked loops used in RF receiving systems, more particularly to such methods and means providing the capabilities, among others, of acquiring the received signal over a wide range of frequencies, of reducing greatly the time for capturing the transmitted signal, and of preventing lock upon modulation side bands, and it is an object of the invention to provide improved methods and means of this nature.

RF receivers utilizing phase-locked loops as detectors, or demodulators, of the transmitted signal are well known. Such systems utilize a voltage controlled oscillator in the receiver circuit to generate locally a signal whose frequency is compared with the frequency of the received signal in a phase detector. The output of the phase detector, when the loop is locked, is a voltage which is proportional to the difference in phase between the locally generated signal and the received signal. The detector voltage after passing through the loop filter is applied to the voltage controlled oscillator to determine the frequency thereof. Within the range of the bandwidth for which such a receiver is designed, it will track the received signal, that is to say, it will demodulate it to extract the intelligence contained therein. Also, it will capture, that is to say lock upon, th received signal if the frequency of that signal does not differ too greatly from the frequency being generated by the local voltage controlled oscillator at the time the signal is being received.

In space applications where the receiver is being carried aboard a missile or other space craft there is no way of knowing the magnitude of the frequency being generated by the local voltage controlled oscillator at the time a transmitted signal is intended to be received. Doppler shifts in frequency, noise, drifts in the frequency of th voltage controlled oscillator due to the elapse of long periods of time, and other factors contribute to the difference between the frequency of the local voltage controlled oscillator and the received signal. Where such frequency difference is too great the phase-lock loop will not capture, or lock upon, the received signal and the intelligence is therefore lost. In instances where the phase-lock loop is used to demodulate the received signals on board the space craft, for example, and the receiver uses a narrow bandwidth phase-lock loop for precise demodulation of the signal, the frequency range wherein the phase-lock loop will capture the transmitted signal is reduced.

For such cases, the prior art has developed aids to assist the phase-lock loop to acquire the received intelligence signal. These include schemes for utilizing a frequency discriminator in parallel with the phase detector of the phase-lock loop, setting the frequency of the local voltage controlled oscillator to a value, hopefully within the acquisition range, and sweeping the frequency of the local voltage controlled oscillator over a range of frequencies in order that the phase-lock loop will lock onto the correct frequency as the sweep frequency sweeps by the frequency of the received signal.

Well known color television systems achieve color by adding color to a monochromatic picture by means of a narrow band frequency interleaved carrier color signal which carries the color information in its phase and amplitude. A phase reference being required to measure the instantaneous phase, the reference information is transmitted in short bursts during line retrace. The color synchronization circuits in the receiver derive a reference signal from these bursts for use in demodulating the color information. A phase-lock loop is typically used for this purpose. The loop bandwidth of this phase-lock loop must be narrow to prevent dynamic errors, resulting in horizontal color streaks in the picture, but when conventional loops are designed for narrow bandwidths, the ability of the circuits to pull into frequency synchronism is severely restricted. The prior art solution to this problem suggests the use of more than one phase-lock loop, one with narrow band characteristics and another with wide band characteristics, the latter having a greater capture range. Switches are provided for connecting the wide band phase-lock loop into the circuit during the acquisition period, and for connecting the narrow band phase-lock loop into the circuit for signal reception purposes after the received signal has been acquired. During the receiving mode, the wide band phase-lock loop is disconnected.

These prior art schemes have not proved completely satisfactory for various reasons, among which are: The complexity of the equipment required along with its tendencies to fail at unknown times, the frequency range of capture is still not great enough for all purposes, and the switching means introduce undesired and undesirable transients into the circuit thereby increasing the noise present, and the costs involved.

Accordingly it is a further object of the invention to provide an automatic signal acquisition method and means for phase-locked loops which will eliminate the shortcomings of the prior art.

It is a further object of the invention to provide methods and means of the character indicated which will provide a positive signal to noise ratio at the input to the phase-lock loop at the command threshold.

It is a further object of the invention to provide improved methods and means of the nature indicated which will provide a very simple implementation of the circuitry with minor increases in necessary hardware over that of the phase-lock loop itself.

It is a further object of the invention to provide improved methods and means of the nature indicated which will prevent locking of the phase-lock loop on modulation side bands.

It is a further object of the invention to provide improved methods and means of the nature indicated wherein the proposed implementation of the circuitry will introduce no frequency errors and negligible noise.

SUMMARY OF THE INVENTION

In carrying out the invention in one form, there is provided, in a phase-lock loop receiver for receiving an input signal, first signal multiplier having two inputs and an output, said input signal being applied to one of said inputs, a feedback loop having a loop filter and a voltage controlled oscillator connected between the output of said first signal multiplier and the other of the inputs of said first signal multiplier, the output of said first signal multiplier being applied to the input of said voltage controlled oscillator and being the normal loop control signal, means for enabling said receiver to acquire said input signal over a wide frequency range comprising circuit means for developing a D.C. voltage whose sign is dependent on whether the frequency of the received signal is greater or lesser than the frequency of the signal generated by said voltage controlled oscillator and whose magnitude is proportional to the magnitude of the difference of said received signal frequency and said voltage controlled oscillator frequency, and means for summing said D.C. voltage and said normal loop control signal and applying same to said voltage controlled oscillator.

In carrying out the invention according to another form, there is provided a phase-lock loop receiver and signal acquisition aid circuit for receiving periodic signals comprising a first multiplier having two inputs and an output for serving as a phaae detector, means for connecting a periodic signal to be received to one of the two inputs of said first multiplier, an oscillator having an input and an output and developing an output frequency which is dependent on its input voltage, a first phase shift network connected between the output of said oscillator and the other of the two inputs of said first multiplier, a first low pass filter connected to the output of said first multiplier for removing higher frequency components resulting from the products of the two inputs to said first multiplier, a summing network, means for connecting the output of said first low pass filter to said summing network, the output of said low pass filter being the loop control signal when the loop is in phase-lock, a loop filter, means for connecting the output of said summing network to said loop filter, means for connecting the output of said loop filter to the input of said oscillator, a second multiplier having two inputs and an output for giving amplitude when the loop is in phase lock, means for connecting said periodic signal to be received to one of the two inputs of said second multiplier, means for connecting the output of said oscillator to the other of the two inputs of said second multiplier, a second low pass filter connected to the output of said second multiplier for removing higher frequency components resulting from the products of the two inputs to said second multiplier, a third multiplier having two inputs and an output, means providing a first signal path from said first low pass filter to one of the two inputs of said third multiplier, means providing a second signal path from said second low pass filter to the second of the two inputs of said third multiplier, means associated with said first and second signal paths for shifting the relative phases of the signals at the two inputs of said third multiplier to a phase condition of one of substantially in phase or substantially one-hundred eighty degrees out of phase, said associated means developing a signal factor whose magnitude varies in proportion to the magnitude of the difference of said received signal frequency and said oscillator frequency and whose sign depends upon whether the frequencey of the received signal is greater or lesser than the frequency of said oscillator, and means for connecting the output of said third multiplier to the second input of said summing network.

BRIEF DESCRIPTION OF THE DRAWING

The single FIGURE is a block diagram of a circuit according to the invention.

DESCRIPTION OF THE PREFERRED EMBODIMENT

Referring to the drawing the invention is shown embodied in a circuit diagram 10 including a phase-lock loop network 12, a signal multiplying network 13 which also serves to give an amplitude signal when the loop is in phase lock and an acquisition aid network 14 which co-operates in combination with the networks 12 and 13 to provide the improved circuit according to the invention. The phase-lock loop network 12 and the signal multiplying network 13 are comprised essentially of well known components and function according to well understood principles, but the outputs of these circuits co-operate with the circuit 14 which also uses well known components to achieve the beneficial results as will be described.

The input signal which may be of an intermediate frequency resulting from the heterodyning of the received signal with a local oscillator in the RF portion of a receiver (not shown) comes over conductor 15 and passes by way of conductors 16 and 17 to the phase-lock loop network 12 and the signal multiplying section 13 respectively. The output of phase-lock loop network 12 which also includes a signal multiplying network passes over conductor 18 to the acquisition aid network 14 and the output of the signal multiplying network 13 passes over conductor 19 to the acquisition aid network 14. The output of the phase-lock loop network 12 is a phase modulated signal and also passes over a conductor 21 to the appropriate circuitry as will be understood. The output of signal multiplying network 13, also, may pass over a conductor 22 to a carrier present amplifier, indicating when the phase-lock loop is in lock.

The components of the phase-lock loop network 12 comprise a signal multiplier 23 which also serves as a phase detector, a low pass filter 24, a summing network 25, a loop filter 26, a voltage controlled oscillator (VCO) 27 and a 90° ($-\pi/2$) phase shift network 28. These components may be of well known forms. The signal multiplier 23 has two inputs 29 and 31 and an output 32. The input 29 of signal multiplier receives the input signal over conductors 15 and 16 and the input 31 of signal multiplier 23 receives its signal over conductor 33 from the phase shift network 28. The output 32 of signal multiplier 23 passes by way of conductor 34 to the low pass filter 24, the output of which passes over conductor 18 and conductor 35 to the summing network 25. The output of the summing network 25 passes over conductor 40 (point E) to the loop filter 26, the output of which passes over conductor 36 to the VCO 27. The output of VCO 27 passes by way of conductors 37 and 38 to the phase shifting network 28.

The signal multiplying network 13 includes a signal multiplier 39 and a low pass filter 41. These components may be of well known forms. The signal multiplier 39 has two inputs 42 and 43 and an output 44. The input 42 of signal multiplier 39 receives its input signal over conductors 15 and 17 and the input 43 of the signal multiplier 38 receives its input signal over conductors 45 and 37 from the output of VCO 27. The output 44 of signal multiplier passes by way of conductor 46 to low pass filter 41 the output of which passes over conductor 19 as already described.

The acquisition aid network 14 comprises an analogue multiplier 47, for example, a four quadrant analogue multiplier, a differentiating circuit 48 and an integrating network 49. Either or both the differentiating circuit 48 and the integrating circuit 49 may be used in particular cases but in a preferred form of the invention the differentiating circuit 48 may be used along while the integrating circuit 49 is absent.

The analogue multiplier 47 has two inputs 50 and 51 and an output 52 (point D). The input 50 of analogue multiplier 47 receives its input signal over conductor 52 from the terminal 53 (point C) between the capacitor 54 and the resistor 55 which together form the differentiating network 48. The input signal to acquisition aid network 14 from the signal multiplying network 13 over conductor 19 is received by way of conductor 56 connected to one terminal of capacitor 54. The remaining terminal of resistor 55 is connected to ground as shown. The other input 51 of analogue multiplier 47 receives its signal by way of conductor 57 connected to terminal 58 between resistor 59 and capacitor 61 which together form the integrating network 49. The input signal to acquisition aid network 14 from the phase-lock loop network 12 by way of conductor 18 is received over conductor 62 to one terminal of resistor 59, the remaining terminal of capacitor 61 being connected to ground as shown.

The output 52 of analogue multiplier 47 is transmitted by way of conductor 63 to one input of the summing network 25. The signal at output 52 of analogue multiplier 47 is the product of the signals applied at inputs 50 and 51 and is shown as being summed negatively, by the negative sign 64, at the entrance to the summing network 25. The negative summing of this signal is for purposes of having the control signal components of the proper relative signs as will become clear. The other input to the summing network 25 is the signal from the phase-lock loop network 12 and comes over conductor 34 as already described. This signal is summed positively by the summing network 25 as shown by the positive sign 65.

The input signal at conductor 15 to the signal multiplier 23 and the signal multiplier 39 is shown in the form of $A \cos \omega_1 t$ and the output of the VCO 27 is shown in the form of: $2 \cos(\omega_2 t + \Theta)$. The frequency of the incoming signal at 15 if $F_1$ and the frequency of the VCO 27 is $F_2$. The couching of the signals in terms of the cosine is arbitrary and they may be stated in terms of the sine, or sine and cosine provided the appropriate circuit networks are utilized in the circuitry. Utilizing the signals in terms of the cos simplifies the mathematical treatment to some extent. In the expressions for the signals, $\omega_1 = 2\pi f_1$ and $\omega_2 = 2\pi f_2$ and $\Theta$ is a phase angle between the output signal of the VCO and the input signal as will become clear. After passing through the phase shift network 28 ($-\pi/2$), the signal at the input 31 of PD 23 becomes $2 \sin(\omega_2 t + \Theta)$.

Inasmuch as the signal multiplier 23 can be represented as an analogue multiplier, it multiplies its two input signals $A \cos \omega_1 t$ and $2 \sin(\omega_2 t + \Theta)$ which yields the expression $\frac{1}{2}[2A \sin(\omega_1 t + \omega_2 t + \Theta) - 2A \sin(\omega_1 t - \omega_2 t - \Theta)]$. This is the output signal 32 ($S_A$) of phase detector 23. The low pass filter 24 removes the high frequency term $(\omega_1 t + \omega_2 t)$ leaving the output signal on conductor 18 as $A \sin(\omega_2 t - \omega_1 t + \Theta)$. This is a signal $S_A'$ at point A' and is one of the inputs to summing network 25, coming over conductor 35.

The signal multiplier 39 also can be rpresented as an analogue multiplier and thus multiplies its input signals $A \cos \omega_1 t$ and $2 \cos(\omega_2 t + \Theta)$ to give an output signal 44 at point B ($S_B$) equal to $\frac{1}{2}[2A \cos(\omega_1 t + \omega_2 t + \Theta) + 2A \cos(\omega_1 t - \omega_2 t - \Theta)]$. The low pass filter 41 removes the high frequency term $(\omega_1 t + \omega_2 t)$ leaving the signal $S_B'$ on conductor 19 equal to $A \cos(\omega_2 t - \omega_1 t + \Theta)$.

The signal $S_B'$ is differentiated by the differentiating circuit 48. In this circuit, at the frequencies utilized, the reactance of capacitor 54 is much greater than the resistance of resistor 55. Accordingly, the signal at point C, $S_C$, becomes $S_C = -A(\omega_2 - \omega_1) \sin(\omega_2 t - \omega_1 t + \Theta)$. The signal $S_C$ is the input to analogue multiplier 47 at 50. In the first analysis, wherein the phase shift network 28 produces a ninety degree lagging phase shift and the differentiating circuit 48 produces a 90° leading phase shift, it is not necessary that the integrating network 49 be present. Accordingly under this condition the signal $S_A'$ is the other input to the analogue multiplier 47 at input 51. The acquisition aid circuit 14 thus has two input signals to it namely $S_B'$ and $S_A'$. The analogue multiplier 47 multiplies its two input signals $S_C$ and $S_A'$ to give the signal, $S_D$, at point D, $S_D = [-A(\omega_2 - \omega_1) \sin(\omega_2 t - \omega_1 t + \Theta) \cdot A \sin(\omega_2 t - \omega_1 t + \Theta)]$. This reduces to $S_D = -KA^2/2 \; (\omega_2 - \omega_1) + KA^2/2 \; (\omega_2 - \omega_1)[\cos 2(\omega_2 t - \omega_1 t + \Theta)]$. The summing network 25 now has as its inputs the signal $S_D$ and the signal $S_A'$ and sums them together, the signal $S_D$ being summed negatively as indicated. Thus the summed signal at point E, $S_E$, is equal to $S_A' - S_D$ which is equal to $A \sin[(\omega_2 - \omega_1)t + \Theta] + KA^2/2 \; (\omega_2 - \omega_1) - KA^2/2 \; (\omega_2 - \omega_1) \cos 2[(\omega_2 - \omega_1)t + \Theta]$. The signal $S_E$ is applied over conductor 40 to the input of loop filter 26 which removes the higher frequency term $2[\omega_2 - \omega_1)t + \Theta]$, leaving as the output signal from the loop filter $S_E = A \sin[(\omega_2 - \omega_1)T + \Theta] + KA^2/2 \; (\omega_2 - \omega_1)$. The constant K can be made any desired value depending upon the constants of the analogue multiplier 47. In the expression for $S_E$, it is evident that the term $\omega_2 - \omega_1$ represents the difference in frequency of the signals generated by the VCO 27 ($F_2$) and the frequency of the input signal, $F_1$. When the frequency of the VCO ($F_2$) is greater than the frequency $F_1$ of the incoming signal, the term $\omega_2 - \omega_1$ is positive and when the frequency $F_2$ of the VCO is less than the frequency $F_1$ of the incoming signal the factor $\omega_2 - \omega_1$ is negative. Accordingly the term $KA^2/2 \; (\omega_2 - \omega_1)$ is a DC term having either positive or negative values dependant upon the difference of the incoming and locally generated frequencies, and it has a magnitude proportional to the magnitude of the frequency difference.

When the phase-lock loop circuit 12 is in lock, that is to say the frequency $F_1$ of the incoming signal is equal to the frequency $F_2$ of the VCO, the factor $\omega_2 - \omega_1$ in the signal $S_E$ becomes zero giving the value of $S_E = A \sin \Theta$. This will be recognized as the normal loop control signal of a phase-lock loop wherein the phase detector has an output voltage whose value is a function of the sine of the phase difference between the two input signals of the phase detector.

When the incoming frequency $F_2$ at 15 and the locally generated frequency of VCO 27, $F_2$ are not equal, the factor $\omega_2 - \omega_1$ has a positive or negative value depending upon the direction of the frequency difference as already pointed out. This DC voltage value is appropriately scaled as by selecting the constant K derived from the analogue multiplier 47 so that the factor $KA^2/2 \; (\omega_2 - \omega_1)$ exceeds in magnitude the term $A \sin \Theta$ where A is the amplitude of a modulated sideband and $\Theta$ is any value of phase angle. As long as the term $KA^2/2 \; (\omega_2 - \omega_1)$ is the greater in magnitude, there is a DC voltage which drives the loop toward lock that is to capture or acquire the incoming signal. There can be no lock on any sideband frequency. Since this DC voltage, proportional to the offset in frequency, is applied directly to the VCO, the frequency of the VCO changes very rapidly to equal that of the incoming signal.

The presence of side bands in the received signal complicates the mathematical analysis, but does not change the result. Accordingly it is not believed necessary to set out the mathematical analysis. The circuit according to the invention will seek the center of the received frequency spectrum.

Referring to the expression for the signal at point C, $S_C$, equal to $-A(\omega_2-\omega_1) \sin(\omega_2 t - \omega_1 t + \Theta)$, it is pointed out that this expression is developed as a result of differentiating the signal $S_B'$. The differentiating network 48 not only shifts the phase 90°, as between the signals at $S_B'$ and $S_C$ which is necessary to produce a signal of the correct phase at the input 50 of analogue multiplier 47, but it develops the factor $-A(\omega_2-\omega_1)$ which when operated upon by the analogue multiplier 47 along with the input signal at 51 results in the DC term $KA^2/2 (\omega_2-\omega_1)$. In other words, the differentiating circuit 48 produces two functions, namely a phase shift and the development of an appropriate factor to ultimately give a DC voltage component proportional to the frequency difference.

The ninety degree, or $-\pi/2$, phase shift produced by the differentiating network 48 compensates for the lag produced by the phase shift network $-\pi/2$ of network 28 so that the inputs 50 and 51 of analogue multiplier 47 are either in phase or one-hundred eighty degrees out of phase depending upon whether the frequency of the input 15, $F_1$, is greater or lesser than the frequency $F_2$ of the VCO 27. Utilizing the differentiating network 48 which provides a lead network as indicated is the preferred form of the invention but other forms may be used if desired either in combination with phase shift network 48 or in lieu thereof. Thus the integrating network 49 may be used as indicated for this purpose, this network being a lagging network and producing a lag of ninety degrees when the resistance of resistor 59 is much greater than the reactance of capacitor 61 at the frequencies employed. Utilizing both the lead network 48 and the lag network 49 can produce an increase or at least maintain the magnitude of the signals applied to inputs 50 and 51 of analogue multiplier 46 as the frequencies change. The integrating network 49 when used also produces a factor which will result in the development of a DC voltage component following multiplication by the analogue multiplier 47 as described previously for the differentiating network 47. It will be evident that the lead network 48 and the lag network 49 may produce leads and lags, respectively, less than ninety degrees but in such a direction that the appropriate phase relationships are maintained at the inputs 50 and 51.

In an actual circuit, the frequency was in the area of 2,100MHz. The input frequency at conductor 15, $F_1$, was 27.5MHz and the circuit was able to acquire signals differing by plus or minus 300KHz as between the received frequency and that of the local VCO 27 with a loop noise bandwidth of 1,000Hz. In one such typical case in the differentiating network, the resistor 55 had a value of 1kohms the capacitor 54 had a capacitance of 820pf (pico farads). When the integrating network was used, the resistor 59 had a value of 900ohms and the capacitor 61 had a value of 390 pf (pico farads). It will be understood that these values are in one typical case and that other values may be selected in particular cases to achieve the desired results.

We claim:

1. In a phase-lock loop receiver for receiving an input signal, including a first signal multiplier having one input to which said input signal is applied and having a second input and an output, a loop filter connected to the output of said first signal multiplier for receiving the output signal thereof, a voltage controlled oscillator having an input connected to said loop filter for receiving the output signal thereof, and a ninety degree phase shift network connected between the output of said voltage controlled oscillator and the second input of said first signal multiplier, means for enabling said receiver to acquire said input signal over a wide frequency range comprising:

a second signal multiplier having two inputs and an output, said input signal being applied to one of said second multiplier inputs, the output signal of said voltage controlled oscillator being connected to the second input of said second signal multiplier, a differentiating network connected to the output of said second signal multiplier, said second signal multiplier combines said input signal and the output signal of said voltage controlled oscillator, a third multiplier connected to said differentiating network and to said first signal multiplier for receiving the output signal of said differentiating network and the output signal of said first signal multiplier, a summing network connected to said third multiplier and to said first signal multiplier for receiving the multiplied output of said third multiplier and the output of said first signal multiplier, and means for supplying the output signal of said summing network to said loop filter.

2. The phase-lock loop receiver according to claim 1 wherein low pass filters are connected respectively in the output circuits of said first signal multiplier and said second signal multiplier for eliminating higher frequency signal components.

3. The phase-lock loop receiver according to claim 2 wherein an integrating network is connected between the input to said third multiplier and the output of said first signal multiplier beyond the connection to said summing network.

4. A phase-lock loop receiver and signal acquisition aid circuit for receiving periodic signals comprising a first signal multiplier having two inputs and an output for producing an output signal corresponding to the product of its inputs, means for connecting a periodic signal to be received to one of the two inputs of said first signal multiplier, an oscillator having an input and an output and developing an output frequency which is dependent on its input voltage, a first phase shift network connected between the output of said oscillator and the other of the two inputs of said first signal multiplier, a first low pass filter connected to the output of said first signal multiplier for removing higher frequency components resulting from the product of the two inputs to said first signal multiplier, a summing network having two inputs, means for connecting the output of said first low pass filter to one of the two inputs of said summing network, the output of said first low pass filter being the loop control signal when the loop is in phase lock, a loop filter, means for connecting the output of said summing network to said loop filter, means for connecting the output of said loop filter to the input of said oscillator, a second signal multiplier having two inputs and an output for producing an output corresponding to the product of its inputs, means for connecting said periodic signal to be received to one of the two inputs of said second signal multiplier, means for connecting the output of said oscillator to the other of the two inputs of said second signal multiplier, a second low pass filter connected to the output of said second signal multiplier for removing higher frequency components resulting from the product of the two inputs to said second signal multiplier, a third multiplier having two inputs and an output, means providing a first signal path from said first low pass filter to one of the two inputs of said third multiplier, means providing a second signal path from said second low pass filter to the second of the two inputs of said third multiplier, means associated with said first and said second signal paths for shifting the relative phases of the signals at the two inputs of said third multiplier to a phase condition of one of substantially in phase or substantially one-hundred eighty degrees out of phase, said associated means developing a signal factor whose magnitude varies in proportion to the magnitude of the difference of said received signal frequency and said oscillator frequency and whose sign depends upon whether the frequency of the received signal is greater or lesser than the frequency of said oscillator, and means for connecting the output of said third multiplier to the second input of said summing network.

5. The phase-lock loop receiver and signal acquisition aid circuit according to claim 4 wherein said first phase shift network comprises a lag network of substantially 90°, and said associated means comprises a lead network of substantially ninety degrees in said second signal path.

6. The phase-lock loop receiver and signal acquisition aid circuits according to claim 5 wherein said lead network comprises a differentiating circuit including a series capacitor and a shunt resistor.

7. The phase-lock loop receiver and signal acquisition aid circuit according to claim 4 wherein said first phase shift network comprises a lag network of substantially 90°, and said associated means comprises a lag network of substantially ninety degrees in said first signal path.

8. The phase-lock loop receiver and signal acquisition aid circuit according to claim 7 wherein the lag network in said first signal path comprises an integrating circuit including a series resistor and a shunt capacitor.

9. The phase-lock loop receiver and signal acquisition aid circuit according to claim 4 wherein said first phase shift network comprises a lag network of substantially 90°, and said associated means comprises a lead network of less than ninety degrees in said second signal path and a lag network of less than 90° in said first signal path.

* * * * *